Patented Sept. 20, 1938

2,130,526

UNITED STATES PATENT OFFICE 2,130,526

DIPHENYL HYDROXY ALKYL ETHERS

Gerald H. Coleman and John W. Zemba, Midland, Mich., assignors to The Dow Chemical Company, Midland, Mich., a corporation of Michigan No Drawing. Application February 20, 1937, Serial No. 126,809

8 Claims. (Cl. 260—150)

This invention concerns the hydroxy-alkyl ethers of hydroxy-diphenyl compounds containing at least one unreactive substituent in one of the benzene rings and in which the alkyl residue of the hydroxy-alkyl radical contains at least 2 carbon atoms. These compounds may also be termed mono-(substituted-diphenyl)-ethers of glycols.

We have prepared members of the above new class of compounds, determined certain of their physical properties whereby they can readily be identified, and have found them useful as plasticizers in cellulose derivative compositions, as intermediates in the preparation of pharmaceutical derivatives, and particularly as toxics for inclusion in fly spray compositions.

These compounds are high-boiling, complex derivatives obtained as viscous liquids or white crystalline solids. They are substantially insoluble in water but somewhat soluble in dilute aqueous alkaline solutions and in most organic solvents.

These new compounds can be prepared by reacting an aqueous solution of an alkali metal salt of a substituted hydroxy-diphenyl compound with a mono-halo-aliphatic alcohol, e. g. ethylene chlorohydrin, 1-bromo-propanol-3, etc.

In preparing the new compounds above-described we generally warm an aqueous solution of an alkali metal salt of a substituted hydroxy-diphenyl compound to its refluxing temperature and add there to a mono-halo-aliphatic alcohol, although, if desired, the substituted hydroxy-diphenyl and halo-alcohol may be mixed together and a suitable alkali, e. g. NaOH or KOH, subsequently added thereto. The reaction mixture is stirred at the refluxing temperature thereof until the reaction is substantially complete, after which the mixture is cooled and allowed to stand whereby an oily layer separates. This oily layer may be fractionally distilled to separate the desired ether compounds in substantially pure form, or it may be used without further purification, for example, in the preparation of fly spray compositions. In certain cases where the substituted hydroxy-diphenyls employed form alkali metal salts which are relatively insoluble in water, it is convenient to employ alcohol or other water-miscible organic solvents in the reaction mixture.

Our new compounds may also be prepared by reacting the substituted hydroxy-diphenyls with alkylene oxides in the presence of suitable catalysts, e. g. sulfuric acid, etc. In preparing the new compounds according to this method, an alkylene oxide, e. g. butylene oxide, can be passed into a mixture of the substituted hydroxy-diphenyl, catalyst, and an inert organic solvent, e. g. carbon tetrachloride, at temperatures below the boiling point of the reaction mixture. The mixture is stirred until the reaction is substantially complete and is thereafter washed successively with aqueous alkali and water and fractionally distilled to obtain the desired hydroxy-alkyl ether product.

The following examples describe in detail the preparation of certain individual members of our new class of compounds, but are not to be construed as limiting the invention:

Example 1

429 grams (2 mols) of a mixture of isomeric mono-chloro-2-hydroxy-diphenyls (consisting of approximately 80 per cent by weight of 2-hydroxy-3-chloro-diphenyl and 20 per cent of 2-hydroxy-5-chlor-diphenyl), 80 grams (2 mols) of sodium hydroxide, and 200 milliliters of water were mixed together and warmed to the refluxing temperature of the mixture. 192 grams of a 42 per cent aqueous azeotrope of ethylene chlorohydrin was slowly run into the refluxing reaction mixture with constant stirring. Heating was continued for one hour, after which the mixture was allowed to stand while an oily layer separated therefrom. The latter was fractionally distilled under reduced pressure, whereby there was obtained 247 grams of a beta-hydroxy-ethyl ether of 2-hydroxy-3-chloro-diphenyl product, boiling at 195°–198° C. at 5–6 millimeters pressure. This product was recrystallized from 95 per cent ethanol to obtain substantially pure beta-hydroxy-ethyl ether of 2-hydroxy-3-chloro-diphenyl having a melting point of 125.5°–126.5° C. This is a white crystalline compound substantially insoluble in water and soluble in most common organic solvents.

Example 2

In a similar manner 2-hydroxy-3,5-dichloro-diphenyl, sodium hydroxide, water, and ethylene chlorohydrin were reacted together to obtain the beta-hydroxy-ethyl ether of 2-hydroxy-3,5-dichloro-diphenyl as a viscous water white liquid boiling at 181°–183° C. at 4–5 millimeters pressure and having a specific gravity of 1.2873 at 20°/4° C.

Example 3

0.14 mol. of 2-hydroxy-2, 5-di-tertiary-butyl-diphenyl, 0.14 mol. of sodium hydroxide, 0.14 mol. of ethylene chloro-hydrin as a 42 per cent aqueous azeotrope, and 100 milliliters of 95 per cent ethanol were reacted together at the refluxing temperature of the reaction mixture. The crude reaction product was diluted with water, whereby an oily layer separated therefrom. Fractional distillation of this oily layer resulted in the isolation of the beta-hydroxy-ethyl ether of 2-hydroxy-3,5-di-tertiary-butyl-diphenyl as a viscous, yellow liquid boiling at 200°-205° C. at 6 millimeters pressure and having a specific gravity of 1.0003 at 65°/4° C.

*Example 4*

In a similar manner 1 mol. of 2-hydroxy-3-chloro-diphenyl, 1 mol. of propylene chlorohydrin as a 51 per cent aqueous azeotrope, and 1 mol. of sodium hydroxide were reacted together in 250 milliliters of 30 per cent by weight aqueous ethanol. Upon crystallization of the oily layer from 95 per cent ethanol, 186 grams of the hydroxy-propyl ether of 2-hydroxy-3-chloro-diphenyl was obtained as a white crystalline product melting at 128.5°-129.5° C.

Other compounds prepared in a similar manner include the following:

Beta-hydroxy-ethyl ether of 2-hydroxy-5-chloro-diphenyl, a water white liquid boiling at 157°-161° C. at 4 millimeters pressure, and having the specific gravity 1.2244;

Beta-hydroxy-ethyl ether of 2-hydroxy-5-isopropyl-diphenyl, a white crystalline solid boiling at 182°-183° C. at 5 millimeters pressure, and having the specific gravity 1.0503 at 65°/4° C.;

Beta-hydroxy-ethyl ether of 3-bromo-4-hydroxy-diphenyl, a white crystalline solid melting at 74.5°-75.5° C., and boiling at 220°-225° C. at 6 millimeters pressure;

Hydroxy-propyl ether of 2-hydroxy-5-isopropyl-diphenyl, a water white liquid boiling at 166°-168° C. at 4 millimeters pressure, and having a specific gravity of 1.0475 at 20°/4° C.;

Hydroxy-propyl ether of 2-hydroxy-3,5-dichloro-diphenyl, a viscous liquid boiling at 173°-176° C. at 4 millimeters pressure, and having a specific gravity of 1.270 at 20°/4° C.;

Hydroxy-propyl ether of 3-bromo-4-hydroxy-diphenyl, a white crystalline solid melting at 82°-83° C. and boiling at 200°-205° C. at 4 millimeters pressure.

Among other hydroxy-alkyl ethers of substituted hydroxy-diphenyl compounds which may be prepared according to the above-described procedures, are the corresponding mono-ethes of 1,3-dihydroxy-propane, 1,4-dihydroxy-butane, 1,3-dihydroxy-2-methyl propane, 1,2-dihydroxy-2-methyl propane, 1,2-dihydroxy-n-butane, the dihydroxy pentanes, etc. These ether compounds may be prepared by substituting chloro-alcohols, such as 1-chloro-propanol-3, 1-chloro-butanol-4, 1-chloro-2-methyl propanol-3, 1-chloro-butanol-2, the chloro-pentanols, etc., for those chlorohydrins shown in the examples. Similarly other substituted hydroxy-diphenyl compounds may be reacted substantially as described to produce a large number of compounds falling within the scope of our invention. Among the compounds which may be so prepared are beta-hydroxy-ethyl ether of 2-hydroxy-4-chloro-diphenyl; beta-hydroxy-ethyl ether of 2-hydroxy-2'-chloro-diphenyl; beta-hydroxy-ethyl ether of 2-hydroxy-3'-chloro-diphenyl; beta-hydroxy-ethyl ether of 2-hydroxy-4'-chloro-diphenyl; beta-hydroxy-ethyl ether of 4-hydroxy-5-chloro-diphenyl; beta-hydroxy-ethyl ether of 4-hydroxy-6-chloro-diphenyl; beta-hydroxy-ethyl ether of 4-hydroxy-2'-chloro-diphenyl; beta-hydroxy-ethyl ether of 4-hydroxy-3'-chloro-diphenyl; beta-hydroxy-ethyl ether of 4-hydroxy-4'-chloro-diphenyl; beta-hydroxy-ethyl of 3-hydroxy-2-chloro-diphenyl; beta-hydroxy-ethyl ether of 3-hydroxy-4-chloro-diphenyl; beta-hydroxy-ethyl ether of 3-hydroxy-5-chloro-diphenyl; beta-hydroxy-ethyl ether of 3-hydroxy-6-chloro-diphenyl; beta-hydroxy-ethyl ether of 3-hydroxy-2'-chloro-diphenyl; beta-hydroxy-ethyl ether of 3-hydroxy-3'-chloro-diphenyl; beta-hydroxy-ethyl ether of 3-hydroxy-4'-chloro-diphenyl; beta-hydroxy-ethyl ether of 2-hydroxy-5-bromo-diphenyl; beta-hydroxy-ethyl ether of 2-hydroxy-2'-bromo-diphenyl; beta-hydroxy-ethyl ether of 2-hydroxy-3'-bromo-diphenyl; beta-hydroxy-ethyl ether of 2-hydroxy-4'-bromo-diphenyl; beta-hydroxy-ethyl ether of 4-hydroxy-6-bromo-diphenyl; beta-hydroxy-ethyl ether of 4-hydroxy-2'-bromo-diphenyl; beta-hydroxy-ethyl ether of 4-hydroxy-4'-bromo-diphenyl; beta-hydroxy-ethyl ether of 3-hydroxy-4-bromo-diphenyl; beta-hydroxy-ethyl ether of 3-hydroxy-6-bromo-diphenyl; beta-hydroxy-ethyl ether of 3-hydoxy-3'-bromo-diphenyl; beta-hydroxy-ethyl ether of 3-hydroxy-4'-bromo-diphenyl; beta-hydroxy-ethyl ether of 2-hydroxy-3,6-dichloro-diphenyl beta-hydroxy-ethyl ether of 2-hydroxy-2',4'-dichloro-diphenyl; beta-hydroxy-ethyl ether of 2-hydroxy-3',4'-dichloro-diphenyl; beta-hydroxy-ethyl ether of 2-hydroxy-4,4'-dichloro-diphenyl; beta-hydroxy-ethyl ether of 2-hydroxy-2',4-dichloro-diphenyl; beta-hydroxy-ethyl ether of 3-hydroxy-4,6-dichloro-diphenyl; beta-hydroxy-ethyl ether of 3-hydroxy-4,4'-dichloro-diphenyl; beta-hydroxy-ethyl ether of 3-hydroxy-2',4'-dichloro-diphenyl; beta-hydroxy-ethyl ether of 4-hydroxy-3,5-dichloro-diphenyl; beta-hydroxy-ethyl ether of 4-hydroxy-2',3-dichloro-diphenyl; beta-hydroxy-ethyl ether of 4-hydroxy-3,4'-dichloro-diphenyl; beta-hydroxy-ethyl ether of 4-hydroxy-2',4'-dichloro-diphenyl; beta-hydroxy-ethyl ether of 2-hydroxy-3,5-dibromo-diphenyl; beta-hydroxy-ethyl ether of 2-hydroxy-2',5-dibromo-diphenyl; beta-hydroxy-ethyl ether of 2-hydroxy-2',4'-dibromo-diphenyl; beta-hydroxy-ethyl ether of 3-hydroxy-4,6-dibromo-diphenyl; beta-hydroxy-ethyl ether of 3-hydroxy-3',6-dibromo-diphenyl; beta-hydroxy-ethyl ether of 3-hydroxy-2',4'-dibromo-diphenyl; beta-hydroxy-ethyl ether of 4-hydroxy-3,5-dibromo-diphenyl; beta-hydroxy-ethyl ether of 4-hydroxy-4',5-dibromo-diphenyl; beta-hydroxy-ethyl ether of 4-hydroxy-2',4'-dibromo-diphenyl; beta-hydroxy-ethyl ether of 2-hydroxy-2',3,5-tribromo-diphenyl; beta-hydroxy-ethyl ether of 2-hydroxy-2',4',5-tribromo-diphenyl; beta-hydroxy-ethyl ether of 2-hydroxy-2',4',6'-tribromo-diphenyl; beta-hydroxy-ethyl ether of 3-hydroxy-2,4,6-tribromo-diphenyl; beta-hydroxy-ethyl ether of 3-hydroxy-3',4,6-tribromo-diphenyl; beta-hydroxy-ethyl ether of 3-hydroxy-2',4',6-tribromo-diphenyl; beta-hydroxy-ethyl ether of 3-hydroxy-2',4',5'-tribromo-diphenyl; beta-hydroxy-ethyl ether of 4-hydroxy-3,4',5-tribromo-diphenyl; beta-hydroxy-ethyl ether of 2-hydroxy-2',3,5-trichloro-diphenyl; beta-hydroxy-ethyl ether of 2-hydroxy-2',4',6'-trichloro-diphenyl; beta-hydroxy-ethyl ether of 3-hydroxy-3',4,6-trichloro-diphenyl; beta-hydroxy-ethyl ether of 4-hydroxy-3,4',5-trichloro-diphenyl; beta-hydroxy-ethyl ether of 2-hydroxy-2',3,4',5-tetrachloro-diphenyl; beta-hydroxy-ethyl ether of 2-hydroxy-2',4',5,6'-tetrachloro-diphenyl; beta-hydroxy-ethyl ether of 2-hydroxy-2',3,4',5,6'-pentachloro-diphenyl; beta-hydroxy-ethyl ether of 3-hydroxy-2,2',4,6-tetrachloro-diphenyl; beta-hydroxy-ethyl ether of 3-hydroxy-3',4,4',6-tetrachloro-diphenyl; beta-hydroxy-ethyl ether of 3-hydroxy-2',4',6,6'- tetrachloro-diphenyl; beta-hydroxy-ethyl ether of 3-hydroxy-2',4,4',6,6'-pentachloro-diphenyl; beta-hydroxy-ethyl ether of 4-hydroxy-2',3,4',5-tetrachloro-diphenyl; beta-hydroxy-ethyl ether of 4-hydroxy-2',4',5,6-tetrachloro-diphenyl; beta-hydroxy-ethyl ether of 4-hydroxy-2',3,4',5,6'-pentachloro-diphenyl; beta-hydroxy-ethyl ether of 2-hydroxy-2',3,4',5-tetrabromo-diphenyl; beta-hydroxy-ethyl ether of 3-hydroxy-2,2',4,6-tetrabromo-diphenyl; beta-hydroxy-ethyl ether of 4-hydroxy-2',3,4',5,6'-pentabromo-diphenyl; beta-hydroxy-ethyl ether of 2-hydroxy-3-ethyl-diphenyl; beta-hydroxy-ethyl ether of 2-hydroxy-4-ethyl-diphenyl; beta-hydroxy-ethyl ether of 2-hydroxy-5-ethyl-diphenyl; beta-hydroxy-ethyl ether of 2-hydroxy-6-ethyl-diphenyl; beta-hydroxy-ethyl ether of 2-hydroxy-2'-ethyl-diphenyl; beta-hydroxy-ethyl ether of 2-hydroxy-3'-ethyl-diphenyl; beta-hydroxy-ethyl ether of 2-hydroxy-4'-ethyl-diphenyl; beta-hydroxy-ethyl ether of 3-hydroxy-2-ethyl-diphenyl; beta-hydroxy-ethyl ether of 3-hydroxy-4-ethyl-diphenyl; beta-hydroxy-ethyl ether of 3-hydroxy-5-ethyl-diphenyl; beta-hydroxy-ethyl ether of 3-hydroxy-6-ethyl-diphenyl; beta-hydroxy-ethyl ether of 3-hydroxy-2'-ethyl-diphenyl; beta-hydroxy-ethyl ether of 3-hydroxy-3'-ethyl-diphenyl; beta-hydroxy-ethyl ether of 3-hydroxy-4'-ethyl-diphenyl; beta-hydroxy-ethyl ether of 4-hydroxy-2-ethyl-diphenyl; beta-hydroxy-ethyl ether of 4-hydroxy-3-ethyl-diphenyl; beta-hydroxy-ethyl ether of 4-hydroxy-2'-ethyl-diphenyl; beta-hydroxy-ethyl ether of 4-hydroxy-3'-ethyl-diphenyl; beta-hydroxy-ethyl ether of 4-hydroxy-4'-ethyl-diphenyl; beta-hydroxy-ethyl ether of 2-hydroxy-3-methyl-diphenyl; beta-hydroxy-ethyl ether of 2-hydroxy-5-secondary-butyl-diphenyl; beta-hydroxy-ethyl ether of 2-hydroxy-4'-isoamyl-diphenyl; beta-hydroxy-ethyl ether of 3-hydroxy-4'-isohexyl-diphenyl; beta-hydroxy-ethyl ether of 4-hydroxy-4'-tertiary-heptyl-diphenyl; beta-hydroxy-ethyl ether of 4-hydroxy-5-n-propyl-diphenyl; beta-hydroxy-ethyl ether of 4-hydroxy-5-tertiary-octyl-diphenyl; beta-hydroxy-ethyl ether of 2-hydroxy-3,5-dimethyl-diphenyl; beta-hydroxy-ethyl ether of 2-hydroxy-3,6-di-isopropyl-diphenyl; beta-hydroxy-ethyl ether of 3-hydroxy-4,6-di-secondary-butyl-diphenyl; beta-hydroxy-ethyl ether of 4-hydroxy-3,5-di-n-amyl-diphenyl; beta-hydroxy-ethyl ether of 4-hydroxy-4',5-diethyl-diphenyl; beta-hydroxy-ethyl ether of 4-hydroxy-2',4'-di-n-propyl-diphenyl; beta-hydroxy-ethyl ether of 2-hydroxy-4-secondary-butyl-5'-ethyl-diphenyl; beta-hydroxy-ethyl ether of 3-hydroxy-4-n-butyl-4',6'-di-isopropyl-diphenyl; beta-hydroxy-ethyl ether of 4-hydroxy-3,5-di-tertiary-butyl-4',6'-di-isopropyl-diphenyl; beta-hydroxy-ethyl ether of 4-hydroxy-2',4',6'-tri-ethyl-diphenyl; beta-hydroxy-ethyl ether of 2-hydroxy-3-chloro-5-tertiary-butyl-diphenyl; beta-hydroxy-ethyl ether of 2-hydroxy-3-n-amyl-5-bromo-diphenyl; beta-hydroxy-ethyl ether of 2-hydroxy-2'-bromo-5-isohexyl-diphenyl; beta-hydroxy-ethyl ether of 3-hydroxy-4-methyl-4',6-dichloro-diphenyl; beta-hydroxy-ethyl ether of 4-hydroxy-3,5-ditertiary-butyl-4'-bromo-diphenyl; beta-hydroxy-ethyl ether of 4-hydroxy-3,5-dichloro-4'-ethyl diphenyl; beta-hydroxy-ethyl ether of 2-hydroxy-5-benzyl-diphenyl; beta-hydroxy-ethyl ether of 4-hydroxy-3-phenyl-ethyl-diphenyl; beta-hydroxy-ethyl ether of 3-hydroxy-4'-benzyl-diphenyl; beta-hydroxy-ethyl ether of 4-hydroxy-3-chloro-5-benzyl-diphenyl; beta-hydroxy-ethyl ether of 2-hydroxy-3-tertiary-butyl-5-benzyl-diphenyl; beta-hydroxy-ethyl ether of 2-hydroxy-3-bromo-4'-ethyl-5-benzyl-diphenyl; beta-hydroxy-ethyl ether of 4-hydroxy-3-benzyl-4',5-dichloro-diphenyl; beta-hydroxy-ethyl ether of 2-hydroxy-3-methoxy-5-bromo-diphenyl; beta-hydroxy-ethyl ether of 2-hydroxy-4-ethoxy-diphenyl; beta-hydroxy-ethyl ether of 4-hydroxy-4'-butoxy-diphenyl; beta-hydroxy-ethyl ether of 3-hydroxy-2-methoxy-6-tertiary-butyl-diphenyl; beta-hydroxy-ethyl ether of 2-hydroxy-3-methoxy-4',6-dichloro-diphenyl; beta-hydroxy-ethyl ether of 2-hydroxy-2'-bromo-3-methoxy-4'-ethyl-5-benzyl-diphenyl; hydroxy-propyl ether of 4-hydroxy-3,4'-dibromo-diphenyl; hydroxy-propyl ether of 4-hydroxy-4'-iodo-diphenyl; hydroxy-propyl ether of 2-hydroxy-5-isohexyl-diphenyl; hydroxy-propyl ether of 3-hydroxy-4'-chloro-6-benzyl-diphenyl; hydroxy-propyl ether of 4-hydroxy-5-methoxy-diphenyl; hydroxy-butyl ether of 2-hydroxy-3,5-dichloro-diphenyl; hydroxy-butyl ether of 2-hydroxy-5-isopropyl-diphenyl; hydroxy-butyl ether of 3-hydroxy-4,4'-dibromo-diphenyl; hydroxy-butyl ether of 3-hydroxy-4-methoxy-diphenyl; hydroxy-butyl ether of 4-hydroxy-3-chloro-5-benzyl-diphenyl; hydroxy-pentyl ether of 2-hydroxy-3,5-dichloro-diphenyl; hydroxy-pentyl ether of 4-hydroxy-3,5-dichloro-diphenyl; hydroxy-pentyl ether of 4-hydroxy-4'-methoxy-diphenyl; etc.

Representative members of the above described group of compounds have been tested by the Peet-Grady method as described in Soap, 8, No. 4, 1932, and found to be particularly valuable as fly spray toxics. For example, a 5 per cent kerosene solution of beta-hydroxy-ethyl ether of 2-hydroxy-3,5-dichloro-diphenyl was found to give an 83 per cent knock-down and a kill of over 46 per cent in 24 hours. 5 per cent kerosene solutions of beta-hydroxy-ethyl ether of 2-hydroxy-5-isopropyl-diphenyl and of hydroxy-propyl ether of 2-hydroxy-5-isopropyl-diphenyl gave kills of 20 and 25 per cent respectively, when tested in a similar manner.

Other modes of applying the principle of our invention may be employed instead of those explained, change being made as regards the materials employed provided the products described in the following claims be thereby obtained.

We, therefore, particularly point out and distinctly claim as our invention:

1. An hydroxy-alkyl ether of an hydroxy-diphenyl compound having attached to one of the benzene rings at least one substituent selected from the class consisting of the alkyl, aralkyl, alkyloxy, and halogen groups, and in which the alkyl residue of the hydroxy-alkyl radical contains at least 2 carbon atoms.

2. An hydroxy-alkyl ether of an hydroxy-diphenyl compound having attached to one of the benzene rings at least one halogen atom, and in which the alkyl residue of the hydroxy-alkyl radical contains at least 2 carbon atoms.

3. An hydroxy-alkyl ether of an hydroxy-diphenyl compound having attached to one of the benzene rings at least one alkyl group, and in which the alkyl residue of the hydroxy-alkyl radical contains at least 2 carbon atoms.

4. An hydroxy-alkyl ether of an hydroxy-diphenyl compound having attached to the oxygenated benzene ring at least one substituent selected from the class consisting of the alkyl, aralkyl, alkyloxy, and halogen groups, and in which the alkyl residue of the hydroxy-alkyl radical contains at least 2 carbon atoms.

5. An hydroxy-alkyl ether of an hydroxy-diphenyl compound having attached to the benzene nuclei a plurality of substituents selected from the class consisting of the alkyl, aralkyl, alkyloxy, and halogen groups, and in which the alkyl residue of the hydroxy-alkyl radical contains at least 2 carbon atoms.

6. An hydroxy-alkyl ether of an hydroxy-diphenyl compound having attached to the benzene nuclei a plurality of halogen atoms, and in which the alkyl residue of the hydroxy-alkyl radical contains at least 2 carbon atoms.

7. An hydroxy-alkyl ether of an hydroxy-diphenyl compound having attached to the benzene nuclei a plurality of alkyl groups, and in which the alkyl residue of the hydroxy-alkyl radical contains at least 2 carbon atoms.

8. The reaction product of an alkali metal salt of an hydroxy-diphenyl compound and an halo-aliphatic alcohol comprising an hydroxy-alkyl ether of an hydroxy-diphenyl compound having attached to one of the benzene rings at least one substituent selected from the class consisting of the alkyl, aralkyl, alkyloxy, and the halogen groups.

GERALD H. COLEMAN.
JOHN W. ZEMBA.